United States Patent
Aswath et al.

(10) Patent No.: US 10,345,765 B2
(45) Date of Patent: Jul. 9, 2019

(54) SYSTEM AND METHOD OF OVERRIDING A SCHEDULED TASK IN AN INTRUSION SYSTEM TO REDUCE FALSE ALARMS

(75) Inventors: Ravikumar Vemagal Aswath, Bangalore (IN); Vinay Hegde, Bangalore (IN)

(73) Assignee: ADEMCO INC., Golden Valley, MN (US)

( * ) Notice: Subject to any disclaimer, the term of this patent is extended or adjusted under 35 U.S.C. 154(b) by 519 days.

(21) Appl. No.: 13/618,405

(22) Filed: Sep. 14, 2012

(65) Prior Publication Data
US 2014/0082623 A1    Mar. 20, 2014

(51) Int. Cl.
*G06F 9/48* (2006.01)
*G05B 15/02* (2006.01)

(52) U.S. Cl.
CPC ........... *G05B 15/02* (2013.01); *G06F 9/4837* (2013.01); *G06F 9/4881* (2013.01); *G06F 9/4887* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 6,212,268 B1 * | 4/2001 | Nielsen | 379/210.01 |
| 6,760,412 B1 | 7/2004 | Loucks | |
| 7,383,586 B2 * | 6/2008 | Cross et al. | 726/30 |
| 7,386,586 B1 * | 6/2008 | Headley et al. | 709/202 |
| 8,155,297 B1 * | 4/2012 | Dhir | H04M 3/42195 379/210.01 |
| 2003/0233188 A1 * | 12/2003 | Jones | 701/200 |
| 2005/0119766 A1 | 6/2005 | Amundson et al. | |

(Continued)

FOREIGN PATENT DOCUMENTS

| | | |
|---|---|---|
| CN | 1281572 A | 1/2001 |
| CN | 1619564 A | 5/2005 |

(Continued)

OTHER PUBLICATIONS

Search and Examination Report for corresponding GB application No. 1315794.6, dated Feb. 4, 2014.

(Continued)

*Primary Examiner* — Wynuel S Aquino
*Assistant Examiner* — Melissa A Headly
(74) *Attorney, Agent, or Firm* — Husch Blackwell LLP

(57) ABSTRACT

Systems and methods of overriding a scheduled task in an intrusion system are provided. A method can include identifying a task scheduled to be executed at a scheduled time, identifying a recipient of an alert message for the task, identifying a transmission medium for the alert message for the task, identifying a predetermined period of time prior to the scheduled time, transmitting the alert message to the recipient via the transmission medium when the predetermined period of time prior to the scheduled time occurs, receiving a response message from the recipient, and, based on contents of the response message, executing the task at the scheduled time, canceling the task at the scheduled time, or rescheduling the task for a new scheduled time. The method can confirm receipt of a valid user password before executing, canceling, or rescheduling the task.

5 Claims, 3 Drawing Sheets

(56) References Cited

U.S. PATENT DOCUMENTS

| | | | |
|---|---|---|---|
| 2005/0181772 A1* | 8/2005 | Crowell | H04L 12/2854 455/414.1 |
| 2006/0066448 A1* | 3/2006 | Berisford | G06Q 50/22 340/504 |
| 2009/0287603 A1* | 11/2009 | Lamar, III | G06Q 20/102 705/40 |
| 2011/0153033 A1 | 6/2011 | Walter | |
| 2012/0311585 A1* | 12/2012 | Gruber et al. | 718/100 |

FOREIGN PATENT DOCUMENTS

| | | |
|---|---|---|
| CN | 201549057 U | 8/2010 |
| GB | 2 428 850 A | 2/2007 |
| KR | 20110118783 A | 11/2011 |

OTHER PUBLICATIONS

First Office Action and Search Report from corresponding CN patent application 201310492515.3, dated Mar. 23, 2017.
English-language translation of the abstract for CN patent application publication 1281572, dated Jan. 24, 2001.
English-language translation of the abstract for CN patent application publication 1619564, dated May 25, 2005.
English-language translation of the abstract for CN patent 201549057, dated Aug. 11, 2010.
English-language translation of the abstract for KR patent application publication 20110118783, dated Nov. 1, 2011.
English-language translation of the First Office Action and Search Report from corresponding CN patent application 201310492515.3, dated Mar. 23, 2017.

* cited by examiner

SYSTEM AND METHOD OF OVERRIDING A SCHEDULED TASK IN AN INTRUSION SYSTEM TO REDUCE FALSE ALARMS

FIELD

The present invention relates generally to intrusion systems. More particularly, the present invention relates to systems and methods of overriding a scheduled task in an intrusion system.

BACKGROUND

Known intrusion systems can include a scheduling option. For example, a user can schedule a task, and the intrusion system can execute the task at a scheduled time. Examples of scheduled tasks can include, but are not limited to, turning on/off lights, setting a thermostat temperature, and locking/unlocking a door.

In some situations and circumstances, it may be desirable and/or necessary to not execute a task at a scheduled time. In these cases, a user must manually cancel, delete, and/or reschedule the task. If the user does not take such action, the unwanted task may be executed at the scheduled time and, in some cases, a false alarm may result.

Accordingly, there is a continuing, ongoing need for a system and method of overriding a scheduled task in an intrusion system.

DETAILED DESCRIPTION

Figure 1:
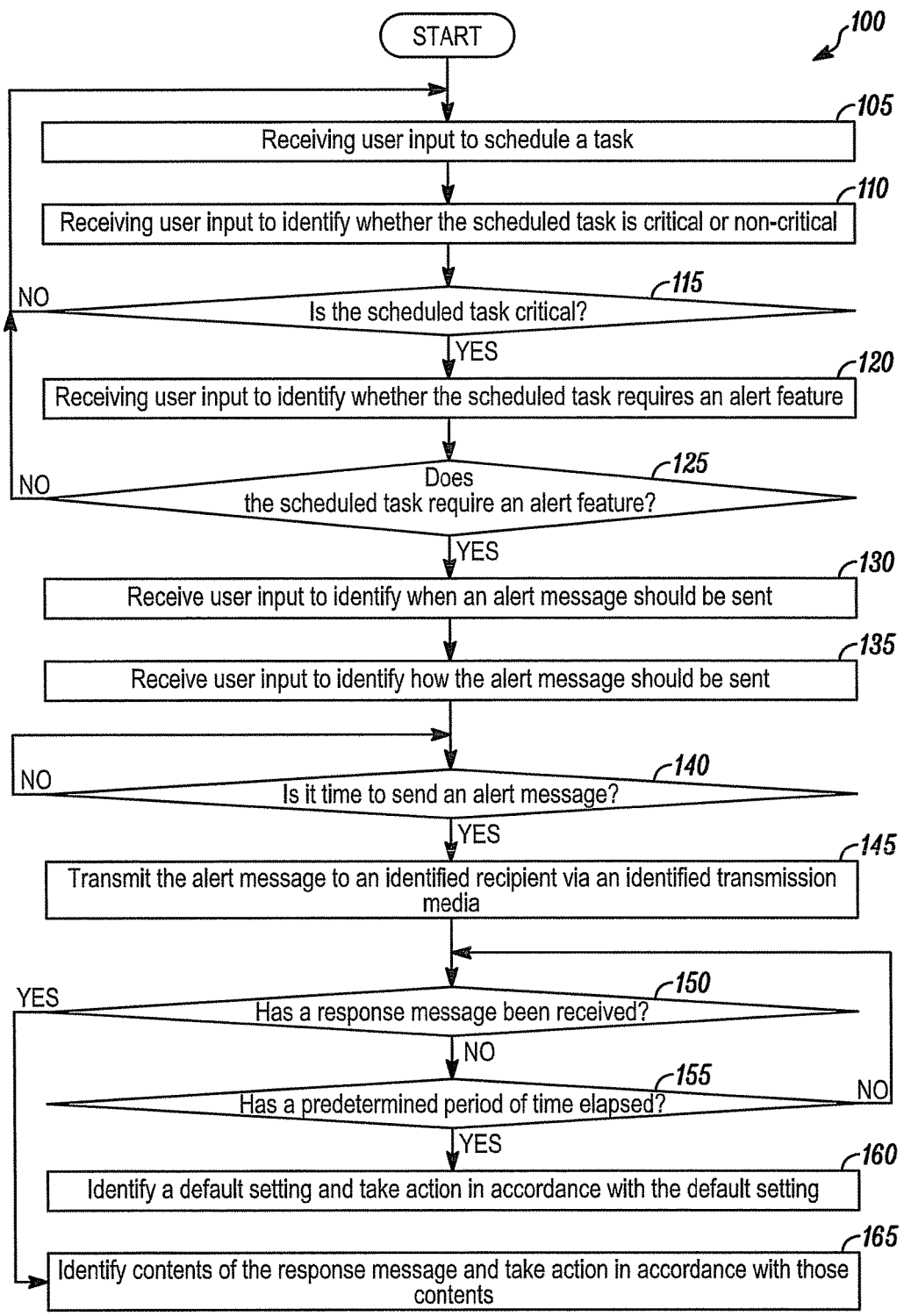
FIG. 1 is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods of overriding a scheduled task in an intrusion system. For example, a scheduled task can be overridden to reduce false alarms and/or to avoid the unwanted execution of a scheduled task.

Although embodiments disclosed herein are described with respect to an intrusion system, it is to be understood that embodiments are not so limited. Instead, systems and methods disclosed herein can be employed in connection with any security system, building installation system, or monitoring system as would be known by those of ordinary skill in the art.

In some embodiments, systems and methods disclosed herein can contact and/or intimate a user before the execution of a scheduled task. For example, systems and methods can contact and/or intimate the user at a predetermined period of time before the task is scheduled to be executed. In some embodiments, the predetermined period of time can be 15-20 minutes, but embodiments disclosed herein are not so limited. In some embodiments, the contact and/or intimation with the user can include an alert message sent to the user that alerts the user about an upcoming scheduled task and that provides the user with details about the scheduled task.

Systems and methods in accordance with disclosed embodiments can contact and/or intimate a user via a plurality of different communication methods and media, such as a telephone call, text message, or email. For example, systems and methods can receive information to identify a user's telephone, smart phone, personal digital assistant, and/or email address and can use such information to contact and/or intimate a user via a respective communication medium. The message transmitted by systems and methods disclosed herein can include a notice or alert that a scheduled task is going to be executed after the predetermined period of time has elapsed.

In some embodiments, systems and methods can identify whether or not a user should be alerted about a particular scheduled task before the scheduled time for the task. That is, in some embodiments, systems and methods need not contact and/or intimate a user before the execution of a scheduled task. Systems and methods can identify a first group of scheduled tasks that require user notification before a scheduled execution and a second group of scheduled tasks that do not require user notification before the scheduled execution. In some embodiments, systems and methods can receive user input to determine whether a scheduled task is in the first group or the second group.

A user can respond to an alert message received from systems and methods disclosed herein. For example, in some embodiments, the user can enter a valid user code or password to respond to an alert message. Based on the user's response, systems and methods can execute a scheduled task at a scheduled time, cancel a scheduled task at a scheduled time, or reschedule a scheduled task. In some embodiments, the user can remotely respond to an alert message by entering a valid user code or password to affirm, cancel, or reschedule a task. When systems and methods disclosed herein require a valid user code or password to reschedule a task, for example, additional security can be achieved by preventing misuse by an unauthorized user.

Systems and methods disclosed herein can be implemented with a control panel, for example, a control panel that is part of an intrusion system. In some embodiments, the control panel can include a user interface that can receive user input to, for example, enable or disable an alert feature, send or receive a text message, configure an email address for a user, or set a phone number for a user.

For example, a user can provide input, such as an email address or a phone number, to which systems and methods disclosed herein can send alert notifications or messages. A user can also provide input to enable an alert for a schedule or a scheduled task. When a schedule or scheduled task is created, a user can provide input to enable or disable an alert feature for the created schedule or scheduled task. That is, the user can provide input to determine whether or not he (or another person) should receive an alert notification or message before the execution of a particular scheduled task. Once an alert feature is enabled, systems and methods can send an alert message to a user before the execution of a scheduled task.

In systems and methods disclosed herein, when a user receives an alert message in the form of a text message or an email message, a user can reply "Yes", "No", or "Reschedule". If a user replies with "Yes", then the scheduled task can be executed at the scheduled time. If a user replies with "No", then the scheduled task can be canceled, and the scheduled task is not executed at the scheduled time. If the user replies with "Reschedule", then the user can reschedule the scheduled task with a new date and time. In some embodiments, the user can remotely provide input to perform the rescheduling.

In systems and methods disclosed herein, when a user receives an alert message in the form of a text message or an email message, a user can reply with a return telephone call. Systems and methods can confirm that the incoming telephone call is from a valid user and, if the user is valid, provide the user with options for entering input to execute, cancel, or reschedule a scheduled task. For example, a user can press "1" on a telephone keypad to execute the scheduled task, press "2" to not execute the scheduled task, or press "3" to reschedule the scheduled task.

In some embodiments, systems and methods can wait for an acknowledgement or reply from a user for a predetermined period of time after sending an alert message. If the acknowledgement or reply is not received within the predetermined period of time or before the scheduled time for execution of a task, then systems and methods can identify a default setting. For example, in some embodiments the default setting can be to execute the task at the scheduled time, and in some embodiments the default setting can be to not execute the task at the scheduled time.

In some embodiments, when a user provides input to cancel a scheduled task or when systems and methods identify a default setting to cancel a scheduled task, systems and methods can cancel that task for the ensuing scheduled time as well as for all scheduled times in the future. However, in some embodiments, when a user provides input to cancel a scheduled task or when systems and methods identify a default setting to cancel a scheduled task, systems and methods can cancel that task for the ensuing scheduled time, but resume execution of the task and transmission of alert messages for scheduled times in the future.

The following advantages can be achieved with the systems and methods disclosed herein: users need not remember to cancel a scheduled task before leaving premises, the occurrence of false alarms can be reduced, and scheduled tasks can be under a user's control. However, it is to be understood that numerous other advantages also come within the spirit and scope of disclosed embodiments.

FIG. 1 is a flow diagram of a method 100 in accordance with disclosed embodiments. As seen in FIG. 1, the method 100 can include receiving user input to schedule a task as in 105. For example, a user can enter the date, time, and frequency for a task. Then, the method 100 can include receiving user input to identify whether the scheduled task is a critical or non-critical task as in 110. For example, a user can select a check box or radio button to identify a scheduled task as critical.

If the method 100 determines that the scheduled task is critical as in 115, then the method 100 can receive user input to determine whether the scheduled task requires an alert feature as in 120. If the method 100 determines that the scheduled task requires an alert feature as in 125, then the method 100 can receive user input to identify when an alert message should be sent as in 130 and can receive user input to identify how and to whom the alert message should be sent as in 135.

For example, the method 100 can receive user input to identify when an alert message should be sent for a scheduled task as in 130. In some embodiments, the user input can indicate that an alert message should be sent at a first predetermined period of time before a scheduled task, and in some embodiments, the user input can indicate the length of the first predetermined period of time. In some embodiments, the user input can indicate that an alert message should be sent before a particular execution of a schedule task, and in some embodiments, the user input can indicate that the an alert message should be sent before every execution of the scheduled task, for example, when a task is scheduled at recurring times.

As explained above, the method 100 can also receive user input to identify how and to whom the alert message should be sent as in 135. For example, the method 100 can receive user input to identify whether an alert message should be sent via a text message, via an email, and/or via a telephone call. Based on the input identifying how the alert message should be sent, the method 100 can also receive user input to facilitate the transmission of the alert message. For example, if the user input indicates that an alert message should be sent via a text message and/or a telephone call, then additional user input can indicate a phone number to which the alert message should be sent. If the user input indicates that an alert message should be sent via an email, then additional user input can indicate an email address to which the alert message should be sent.

The method 100 can determine when an alert message should be sent as in 140. For example, the method 100 can determine the occurrence of a first predetermined period of time before a scheduled task that has been identified as critical and as requiring an alert message. When the method 100 determines that an alert message should be sent as in 140, then the method 100 can transmit the alert message to an identified recipient via an identified transmission media as in 145.

After an alert message has been sent as in 145, the method 100 can determine if a response message has been received as in 150. If the response message has not been received as in 150, then the method, as in 155, can determine if a second predetermined period of time has elapsed since the alert message was sent as in 145. In some embodiments, the second predetermined period of time can be equal to the first predetermined period of time. If the method 100 determines that the second predetermined period of time has not elapsed as in 155, then the method 100 can continue to determine if a response message has been received as in 150.

However, if the method 100 determines that the second predetermined period of time has elapsed as in 155, then the method 100 can identify a default setting and take action in accordance with the default setting as in 160. For example, if the default setting is to execute the scheduled task in the absence of a response message, then the method 100 can execute the scheduled task. If the default setting is to cancel the scheduled task in the absence of a response message, then the method 100 can cancel the scheduled task.

When the method 100 determines that a response message has been received as in 150, the method 100 can identify the contents of the response message and take action in accordance with those contents as in 165. For example, if the contents of the response message indicate that the scheduled task is to be executed, then the method 100 can execute the task at the scheduled time. If the contents of the response message indicate that the scheduled task is to be canceled, then the method 100 can cancel execution of the task at the scheduled time and/or at future scheduled times for a recurring task. If the contents of the response message indicate that the scheduled task is to be rescheduled, then the method 100 can reschedule the task for another time. In some embodiments, the contents of the response message can indicate the other time at which the task should be rescheduled.

Figure 2:
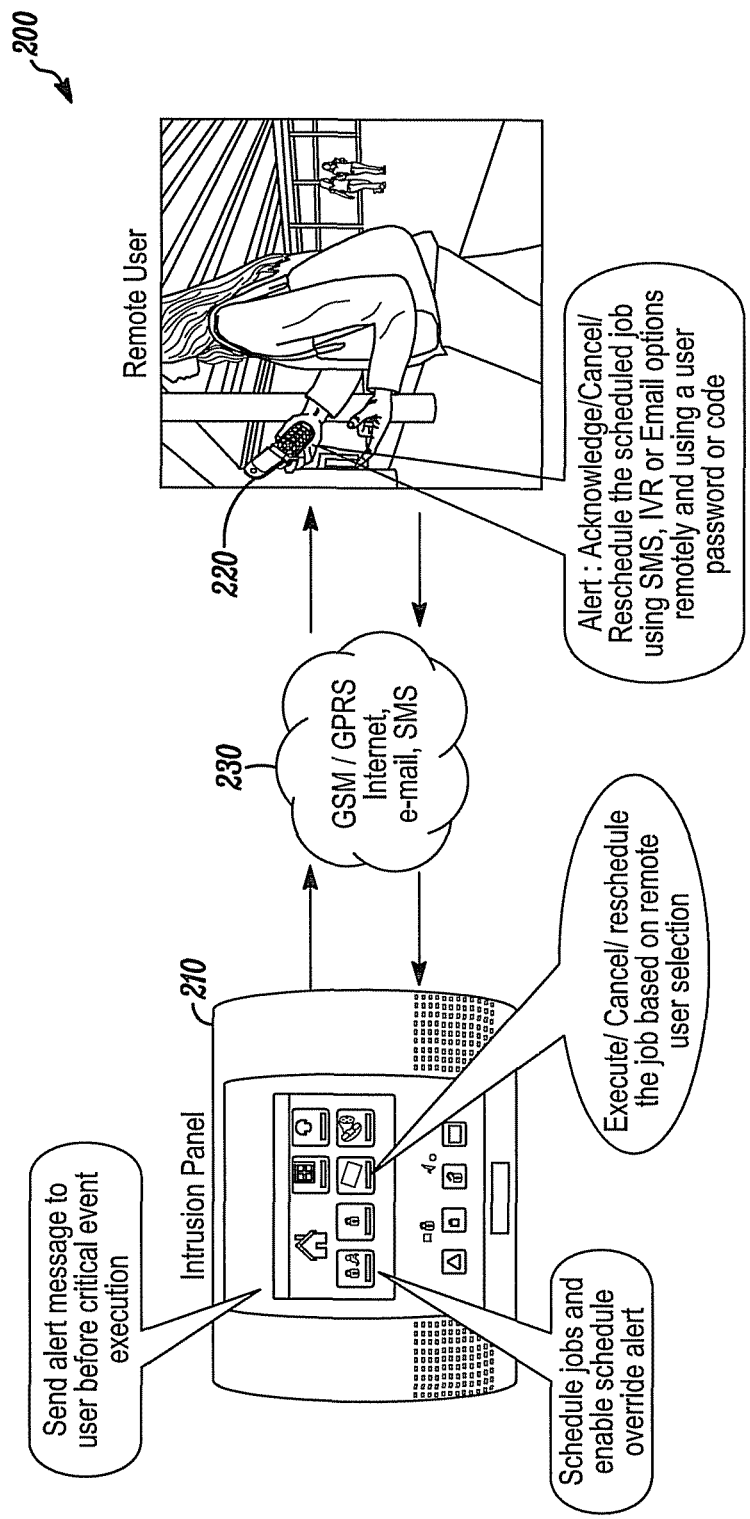
FIG. 2 is a diagram of a system for carrying out the method of FIG. 1 and others in accordance with disclosed embodiments.

FIG. 2 is a diagram of a system 200 for carrying out the method 100 of FIG. 1 and others in accordance with disclosed embodiments. As seen in FIG. 2, the system 200 can include a control panel 210 of an intrusion system, security system, building installation system, monitoring system, or the like. The system 200 can also include a remote user device 220, for example, a telephone, smart phone, personal digital assistant, laptop, or personal computer for receiving text messages, emails, and/or telephone calls.

The control panel 210 can receive user input to schedule a task and to enable an alert feature for a scheduled task. Then, for scheduled tasks with an enabled alert feature, the control panel 210 can identify a predetermined period of time before the scheduled time for the task and, at that time, transmit an alert message to the remote user device 220.

Upon receiving an alert message from the control panel 210, the remote user 220 can transmit a response message to the control panel 210 with instructions to execute, cancel, or reschedule a scheduled task. Based on the remote user instructions, the control panel 210 can take action accordingly.

As seen in FIG. 2, the control panel and the remote user device 220 can communicate via a network 230 that supports GSM/GPRS, Internet, e-mail, and/or SMS. However, embodiments disclosed herein are not so limited. Instead, devices in the system can communicate via any network as would be known by those of skill in the art.

Figure 3:
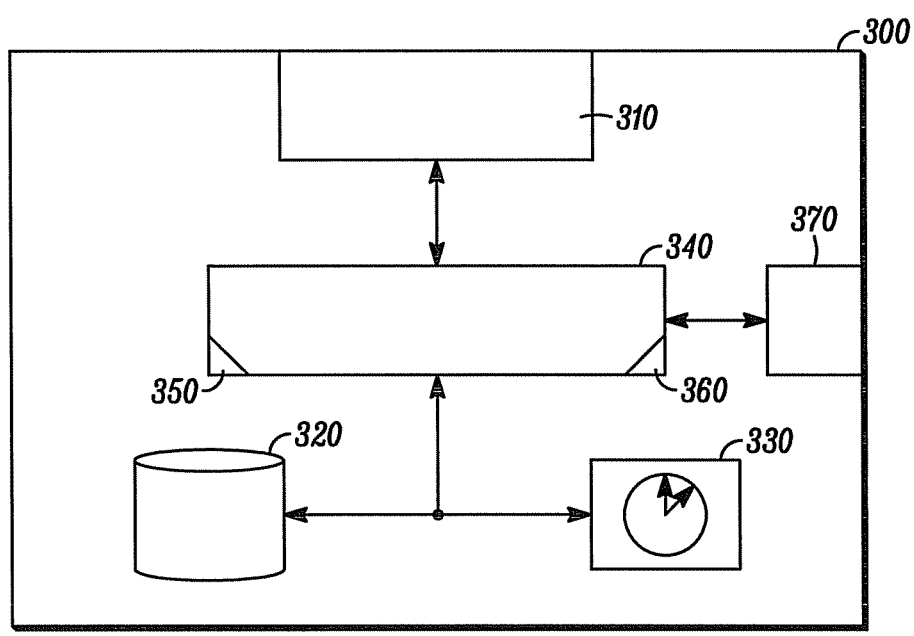
FIG. 3 is a block diagram of a control panel in accordance with disclosed embodiments.

The method 100 of FIG. 1 and others in accordance with disclosed embodiments can be executed by a control panel, for example, the control panel 300 shown in FIG. 3. As seen in FIG. 3, the control panel 300 can include a transceiver 310, a memory device 320, a clock or timer 330, control circuitry 340, one or more programmable processors 350, executable control software 360, and a user interface 370.

The executable control software 360 can be stored on a transitory or non-transitory computer readable medium, including but not limited to, computer memory, RAM, optical storage media, magnetic storage media, flash memory, and the like. In some embodiments, the executable control software 360 can execute the steps of the method 100 shown in FIG. 1 as well as others disclosed herein.

The user interface 370 can include input and output mechanisms. For example, input mechanisms of the user interface can receiver user input for scheduling a task, for enabling/disabling an alert feature, and for providing transmission information for an alert message.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method comprising:
   identifying a task scheduled to be executed at a first scheduled time;
   identifying a recipient of an alert message for the task;
   identifying a first transmission medium for the alert message, wherein the first transmission medium is SMS, email, or telephone;
   identifying a first predetermined period of time prior to the first scheduled time;
   when the first predetermined period of time prior to the first scheduled time occurs, transmitting the alert message to a user device of the recipient via the first transmission medium;
   receiving a response message from the recipient or failing to receive the response message from the recipient within a second predetermined period of time after transmitting the alert message to the user device;
   when the response message is received from the recipient within the second predetermined period of time and includes first instructions to execute the task at the first scheduled time, executing the task at the first scheduled time;
   when the response message is received from the recipient within the second predetermined period of time and includes second instructions to cancel the task at the first scheduled time, canceling the task at the first scheduled time;
   when the response message is received from the recipient within the second predetermined period of time and includes third instructions to cancel the task at a plurality of second scheduled times, canceling the task at each of the plurality of second scheduled times;
   when the response message is received from the recipient within the second predetermined period of time and includes fourth instructions to reschedule the task for a new scheduled time, rescheduling the task for the new scheduled time; and
   when the response message from the recipient is not received within the second predetermined period of time, identifying a default setting and taking action in accordance with the default setting,
   wherein the default setting includes executing the task at the first scheduled time or canceling the task at the first scheduled time,
   wherein receiving the response message from the recipient includes receiving the response message via a second transmission medium,
   wherein the second transmission medium is SMS, email, or telephone, and
   wherein the second transmission medium is different than the first transmission medium.

2. The method of claim 1 wherein content of the alert message includes information about the task and the first scheduled time.

3. The method of claim 1 further comprising identifying whether the task requires transmission of the alert message.

4. The method of claim 1 further comprising, after receiving the response message from the recipient, confirming receipt of a valid user password before executing the task at the first scheduled time, canceling the task at the first scheduled time, or canceling the task at each of the plurality of second scheduled times.

5. An apparatus comprising:
   a transceiver;
   a user interface;
   a programmable processor; and
   executable control software stored on a non-transitory computer readable medium, wherein the user interface receives user input that identifies a task scheduled to be executed at a first scheduled time, that identifies a recipient of an alert message for the task, that identifies a first transmission medium for the alert message, and that identifies a first predetermined period of time prior to the first scheduled time, wherein the first transmission medium is SMS, email, or telephone, wherein the programmable processor and the executable control software determine an occurrence of the first predetermined period of time prior to the first scheduled time, wherein, upon the occurrence, the transceiver transmits the alert message to a user device of the recipient via the first transmission medium, wherein the transceiver receives a response message from the recipient or fails to receive the response message from the recipient within a second predetermined period of time after transmitting the alert message to the user device, wherein, when the transceiver receives the response message from the recipient within the second predetermined period of time and the response message includes first instructions to execute the task at the first scheduled time, the programmable processor and the executable control software execute the task at the first scheduled time, wherein, when the transceiver receives the response message from the recipient within the second predetermined period of time and the response message includes second instructions to cancel the task at the first scheduled time, the programmable processor and the executable control software cancel the task at the first scheduled time, wherein, when the transceiver receives the response message from the recipient within the second predetermined period of time and the response message includes third instructions to cancel the task at a plurality of second scheduled times, the programmable processor and the executable control software cancel the task at each of the plurality of second scheduled times, wherein, when the transceiver receives the response message from the recipient within the second predetermined period of time and the response message includes fourth instructions to reschedule the task for a new scheduled time, the programmable processor and the executable control software reschedule the task for the new scheduled time, wherein, when the transceiver fails to receive the response message from the recipient within the second predetermined period of time, the programmable processor and the executable control software identify a default setting and take action in accordance with the default setting, wherein the default setting includes executing the task at the first scheduled time or canceling the task at the first scheduled time, wherein the transceiver receives the response message from the recipient via a second transmission medium, wherein the second transmission medium is SMS, email, or telephone, and wherein the second transmission medium is different than the first transmission medium.

* * * * *